United States Patent [19]

Seaney et al.

[11] Patent Number: 5,782,269
[45] Date of Patent: Jul. 21, 1998

[54] SOFT SEAL POPPET TYPE CHECK VALVE

[75] Inventors: Steven P. Seaney, Glen Ellyn; Rita R. Waller, Edelstein; Randall A. Harlow, Brimfield; Robert A. Lapke, Peoria; Joseph F. Duffy, Metamora; James R. Carlberg, Peoria; Joseph T. Phillips, Dunlap, all of Ill.

[73] Assignee: Caterpillar Inc., Peoria, Ill.

[21] Appl. No.: 833,230

[22] Filed: Apr. 14, 1997

[51] Int. Cl.$^6$ ..................................................... F16K 15/00
[52] U.S. Cl. .................... 137/630.22; 137/512.3; 137/516.29; 137/539; 137/540
[58] Field of Search ............... 137/630.22, 512.3, 137/539, 516.29, 901, 540, 513; 251/333, 356

[56] References Cited

U.S. PATENT DOCUMENTS

| | | | |
|---|---|---|---|
| 2,445,334 | 7/1948 | Page | 137/630.22 |
| 2,521,201 | 9/1950 | Clark et al. | 137/540 |
| 2,662,477 | 12/1953 | Logan et al. | 137/512.3 |
| 2,678,630 | 5/1954 | Frederiksen | 137/630.22 |
| 2,772,693 | 12/1956 | Boileau et al. | 137/512.3 |
| 2,905,487 | 9/1959 | Schifter | 137/630.22 |
| 2,918,078 | 12/1959 | Cummings | 251/333 |
| 3,580,275 | 5/1971 | Hanson et al. | 137/540 |
| 3,682,437 | 8/1972 | Miller | 251/333 |
| 3,993,361 | 11/1976 | Stelzer | 137/512.3 |
| 4,172,469 | 10/1979 | Boehringer | 137/512.3 |
| 4,655,251 | 4/1987 | Nimberger | 137/516.29 |
| 4,738,282 | 4/1988 | Boehringer | 137/512.3 |
| 4,887,872 | 12/1989 | Admas et al. | 305/10 |
| 4,947,672 | 8/1990 | Pecora et al. | 137/512.3 |
| 5,165,443 | 11/1992 | Buchanan | 137/630.22 |
| 5,299,598 | 4/1994 | Quartana, III et al. | 137/540 |
| 5,332,000 | 7/1994 | Gassner | 251/333 |

*Primary Examiner*—Denise L. Ferensic
*Assistant Examiner*—Joanne Y. Kim
*Attorney, Agent, or Firm*—John W. Grant; Calvin E. Glastetter

[57] ABSTRACT

A check valve normally blocks fluid flow from a bore to a passage and includes a spring normally holding a ball in sealing engagement with a valve seat to form a primary metal-to-metal hard seal. Another spring normally holds a poppet in engagement with another valve seat causing an annular protuberance formed on the poppet to sealingly engage a resilient seal to provide a more positive secondary soft seat seal. The poppet is unseated from the valve seat by a stem of a piston prior to the ball being unseated from the valve seat by a guide stem of the poppet so that the soft seal is opened at essentially zero flow conditions.

10 Claims, 2 Drawing Sheets

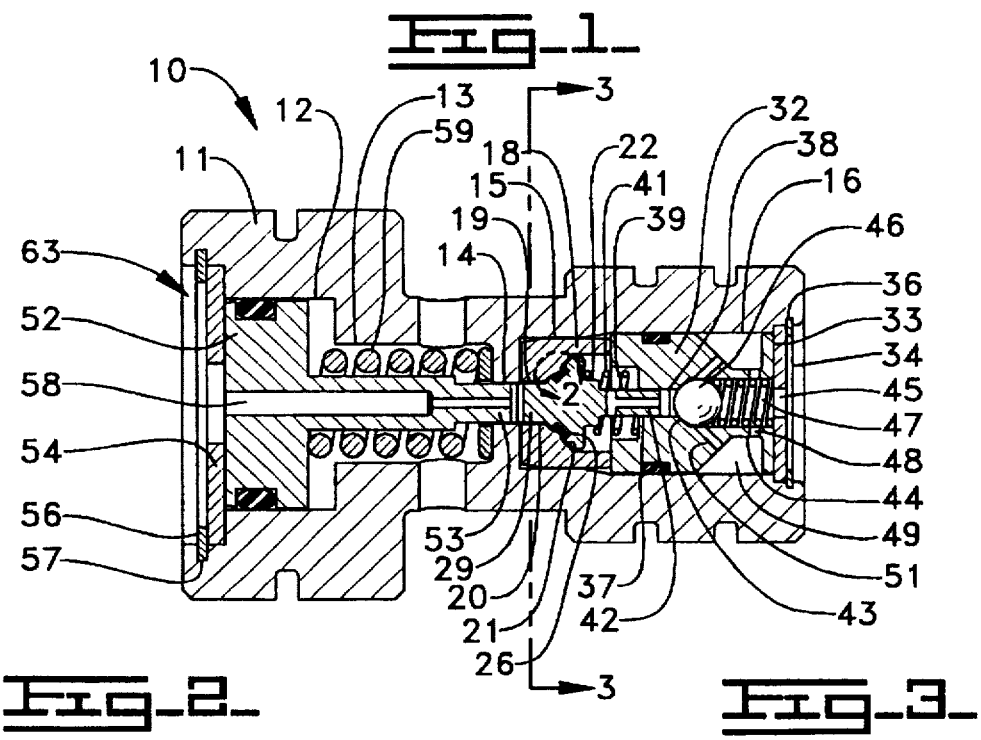
Fig_1_
Fig_2_          Fig_3_
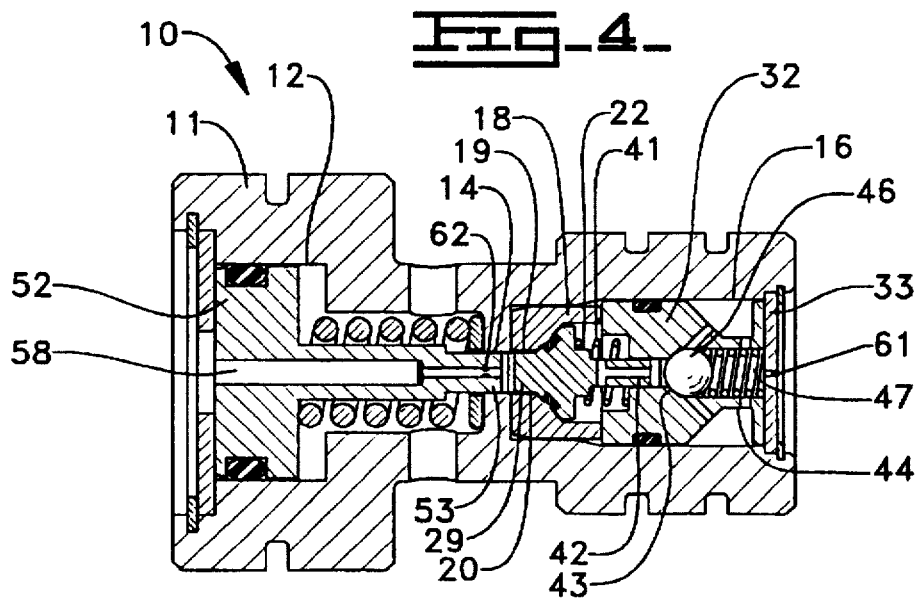
Fig_4_

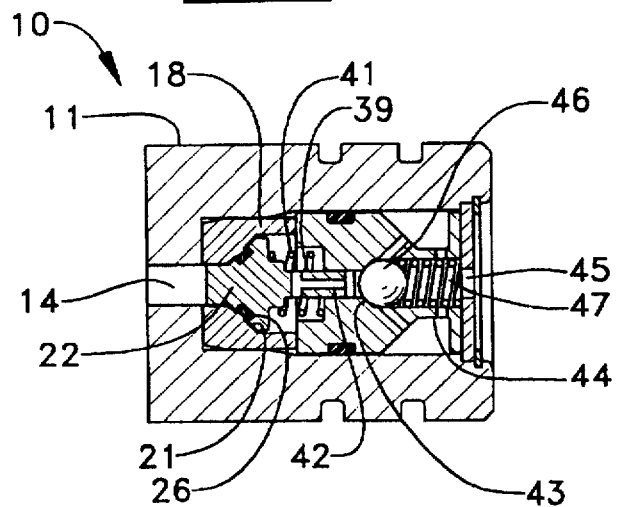
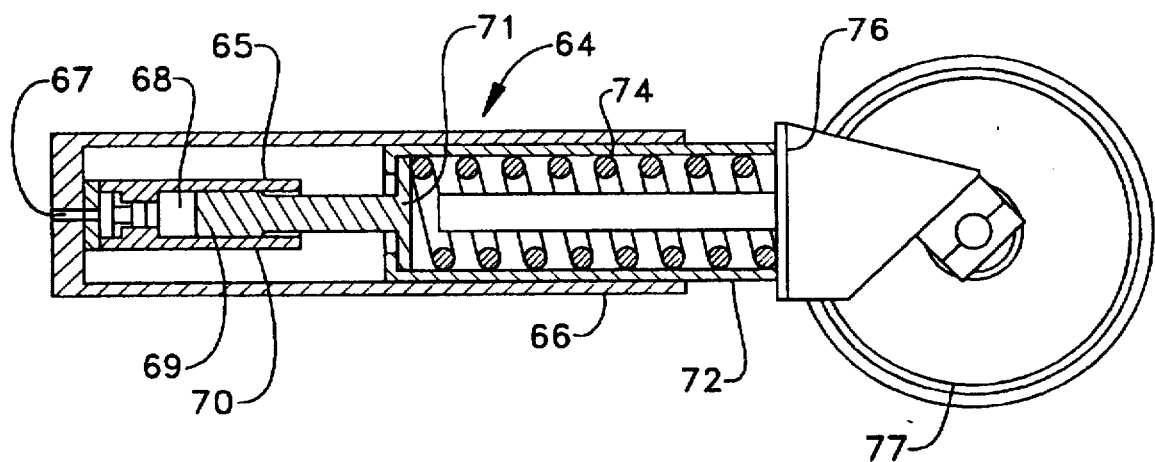

SOFT SEAL POPPET TYPE CHECK VALVE

TECHNICAL FIELD

This invention relates generally to a poppet type check valve and, more particularly, to a poppet type check valve employing a resilient or soft seal disposed between a conical poppet and a matching conical valve seat.

BACKGROUND ART

The track adjuster flow control mechanism disclosed in U.S. Pat. No. 4,887,872 includes a pilot actuated check valve having a ball normally biased into engagement with a valve seat to trap a controlled volume of oil in a track adjuster to set the optimum tension in an endless track. The ball can be mechanically unseated by pressurized oil to either add pressurized oil to the track adjuster should the track tension decrease, for example, due to wear to the components of the track mechanism or to vent oil from the track adjuster should the track tension increase due to packed mud on the drive sprocket and/or the idler wheel, for example. Both the ball and valve seat are metal to provide essentially a metal-to-metal or hard seal generally considered to be a "zero" leak seal. However, the extremely severe operating conditions imposed on the check valve leads to premature leakage through the valve. For example, the oil in the track adjuster is sometimes pressurized to about 1250 bar when a foreign object passes between the endless track and drive sprocket or idler wheel. This extremely high pressure acts directly on the ball and can cause peening or distortion of the valve seat which allows a small amount of leakage to occur. Even a small amount of leakage adversely affects the tension in the endless track once the foreign object is dislodged from between the endless track and the drive sprocket or idler wheel. This requires the operator to be more diligent in adjusting the track adjuster to reset the track tension to the optimum condition.

An initial attempt at replacing the metal-to-metal ball type check valve with a soft seal poppet type check valve was not successful. The known soft seat poppet type check valves have a resilient elastomeric O-ring seal disposed in a containment groove in the poppet for engaging a mating conical face of the valve seat. At the closed position of the check valve, the resilient seal is compressed completely into the containment groove and is essentially protected from shearing forces of the high pressure oil. However, as the poppet moves away from the conical face of the valve seat, the resilient seal expands above the face of the poppet and is subjected to extremely high shear forces due to the high pressure differential across the resilient seal particularly when the poppet valve is opened to release oil from the track adjuster. This results in substantial erosion of the resilient seal. Moreover, at the fully open position, the resilient seal is sometimes washed out of the containment groove due to the high oil flows through the check valve.

Thus, it would be desirable to provide a check valve usable in an automatic track adjuster, and which has extremely low leakage and can withstand extremely high pressures and flows without being eroded or washed out of the containment groove.

The present invention is directed to overcoming one or more of the problems as set forth above.

DISCLOSURE OF THE INVENTION

In one aspect of the present invention, a soft seat poppet style check valve has a poppet normally biased to a closed position blocking fluid flow through the check valve and having an open position establishing a flow path through the check valve. A valve seat defined in a valve body has a conical face. The poppet has a conical face disposed for engagement with the conical face of the valve seat. A resilient seal is disposed within an annular groove recessed into one of the conical faces. An annular protrusion extending from the other of the conical faces is disposed to engage the resilient seal when the conical faces are in engagement with each other.

BRIEF DESCRIPTION OF THE DRAWINGS

FIG. 1 is a diagrammatic sectional view of an embodiment of the soft seal poppet type check valve;

FIG. 2 is an enlarged sectional view encircled generally by line 2—2 of FIG. 1;

FIG. 3 is an enlarged sectional view taken along line 3—3 of FIG. 1;

FIGS. 4 and 5 are sectional views of other embodiments of the soft seal poppet type check valve; and FIG. 6 is a diagrammatic sectional view of the soft seal poppet type check valve of FIG. 1 in combination with a track adjuster mechanism.

BEST MODE FOR CARRYING OUT THE INVENTION

Referring now to FIGS. 1–3, a soft seal poppet type check valve 10 includes a valve body 11 having a plurality of concentric bores 12–16. An annular insert 18 is press fitted within the bore 15 and has a bore 19 in axial alignment with and adjacent to the bore 14, a plurality of longitudinally extending grooves 20 within the bore 19 and a conical valve seat 21 communicating with the grooves 20. A poppet 22 is positioned within the insert 18 and has a conical face 23 disposed for sealing engagement with a mating conical face 24 of the valve seat 21. A soft or resilient elastomeric seal 26 is suitably bonded within an annular seal groove 27 recessed into the conical face 23 of the poppet 22. An arcuate shaped annular protuberance 28 extends from the conical face 24 and is disposed to engage the soft seal when the conical faces are in engagement. The poppet has a guide stem 29 extending into the bore 19 of the insert. As more clearly shown in FIG. 2, the seal 26 has an arcuate shaped protuberance 31 which is lower than the conical face 23 in its free state shape. Alternatively, the groove 27 and the seal 26 can be provided in the conical face 24 of the insert and the protuberance 22 formed on the conical face 23 of the poppet.

Another insert 32 is sealingly disposed within the bore 16 of the valve body 11 and is retained in abutment with the insert 18 by a washer 33 and a retaining ring 34 seated in an annular groove 36 of the valve body. The poppet 22 has another guide stem 37 extending into a bore 38 in the insert 32. A spring 39 disposed within a spring cavity 41 co-jointly defined in the inserts 18 and 32 resiliently biases the poppet 22 into sealing engagement with the valve seat 21 of the insert 18. A passage 42 defined in the guide stem 37 communicates with the spring cavity 41.

The insert 32 is a metallic material and has a valve seat 43 disposed between the bore 38 and another bore 44 that communicates with a central hole 45 in the washer 33. A metallic ball 46 is resiliently urged into engagement with the valve seat 43 by a spring 47. A pair of radial passages 48 adjacent the washer 33, an annular groove 49 and a pair of angled passages 51 provide a flow path around the ball 46.

An actuator piston 52 is slidably disposed within the bore 12 of the valve body 11 and has a stem 53 slidably and sealingly extending into the bore 14 of the valve body 11 for engagement with the guide stem 29 of the poppet 22. The piston 52 is retained in the bore 12 with a washer 54 and a retaining ring 56 seated within an annular groove 57. A passageway 58 extends through the piston 52 and the stem 53 to communicate the central hole in the washer 54 with the grooves 20 defined in the bore 19 of the insert 18. A spring 59 resiliently biases the piston into engagement with the washer 54.

Another embodiment of the check valve 10 of the present invention is disclosed in FIG. 4. In this embodiment, the size of the central hole 45 in the washer 43 is reduced defining an orifice 61 communicating with the bore 44. Another orifice 62 is disposed within the passage 58 adjacent the guide portion 29 of the poppet 22.

The embodiments of FIGS. 1 and 4 are designed to be sealingly contained within a housing to define an actuating chamber generally indicated at 63 at the left end of the valve body 11 in continuous communication with the passage 58.

Still another embodiment of the check valve 10 of the present invention is disclosed in FIG. 5. In this embodiment, the left end portion of the valve body 11, the piston 52, and associated components have been omitted to provide a check valve that is not pilot actuated. The poppet 22 of this check valve is opened directly by pressurized fluid entering the body 11 through the bore 14 which now functions as an input port. While the poppet 22 is shown having guide stems 29 and 37 extending into the cooperating bores 19 and 38, those stems can alternatively be omitted.

Referring to FIG. 6, the check valve 10 of FIGS. 1-4 was designed primarily for use as the control valve of a hydraulic track adjuster 64 similar to that disclosed in U.S. Pat. No. 4,887,872. The check valve 10 is disposed within a fluid cylinder 65 disposed within a tubular housing 66 for controlling fluid flow between an input port 67 and a track adjusting chamber 68 defined by a piston rod 69 slidably extending into a bore 70 of the fluid cylinder 65. A flange 71 connected to the end of the piston rod is disposed within a cylinder 72 slidably extending into the open end of the tubular housing 66. A recoil spring 74 is disposed within the cylinder 72 between the flange and a bracket 76 secured to the cylinder 72. An idler wheel 77 is suitably rotatably carried by the bracket 76. As described in the above-noted patent, optimum track tension within the endless track (not shown) that encircles the idler wheel is established by adding oil to or venting oil from the track adjusting chamber 68 by controllably establishing a flow path through the check valve.

INDUSTRIAL APPLICABILITY

The check valve 10 of the present invention may be employed to normally block fluid flow through the valve from the bore 44 to the passage 58 since the spring 47 and fluid pressure in the bore 44 normally hold the ball 46 in sealing engagement with the valve seat 43 and the spring 39 and fluid pressure in the chamber 41 hold the poppet 22 in engagement with the valve seat 21 causing the protuberance 28 to seal against the soft seal 26. The metal-to-metal seal provided by engagement between the ball 46 and the valve seat 43 provide the primary blockage of fluid flow through the valve. Any fluid leaking by the ball 46 passes through the passage 42 into the chamber 41 and is then secondarily blocked by the more positive sealing aspects of the redundant sealing engagement between the protuberance 31 and the soft seal 26. Also, engagement between the conical faces 23 and 24 of the poppet 22 and the valve seat 21 provide an additional hard seat seal.

The poppet 22 and the ball 46 of the embodiment of FIGS. 1-3 are sequentially mechanically unseated by the stem 53 of the piston 52 to enable pressurized fluid to pass from the passage 58 to the bore 44 when the pressure in the passage 58 is greater than the pressure in the bore 44 to enable pressurized fluid to pass from the bore 44 to the passage 58 when the pressure in the bore 44 is greater than the pressure in the passage 58. In either situation, the piston 52 and the stem 53 move rightward causing the stem 53 to engage the guide stem 29 of the poppet 22 when pressurized fluid is directed into the actuating chamber 63. The poppet 22 is subsequently moved away from the valve seat 21 prior to the ball 46 being unseated from the valve seat 43 to communicate the passage 58 with the chamber 41 through the grooves 20. The rightward movement of the poppet 22 causes the guide stem 42 to mechanically engage the ball 46 and move the ball away from the valve seat 43 to communicate the chamber 41 with the bore 44.

In the opening sequence described above, the spring chamber 41 is filled with oil. Since the poppet 22 is unseated prior to unseating the ball 46, the fluid flow path between the protuberance 28 and the seal 26 occurs at essentially zero flow so that the seal is protected from fluid flow damage. Moreover, the seal is disposed below the face of the face 23 to further protect the seal from flow damage once the ball 46 is unseated and fluid flow is established between the passage 58 and the bore 44 in either direction. The grooves 20 in the bore 19 provide a means to equally route fluid flow passing the seal at the open position of the poppet.

The poppet 22 of the check valve 10 disclosed in the FIG. 5 embodiment is hydraulically unseated by pressurized oil entering the bore 19 to pass oil into the chamber 41. Movement of the poppet 22 to the open position causes the guide stem 37 to unseat the ball 46 from the valve seat 43 to pass oil from the chamber 41 to the hole 55 thereby establishing a flow path from the bore 19 to the opening 55.

In the embodiment of FIG. 4, the orifice 62 tends to instantaneously trap oil between the stems 29 and 53 and in the grooves 20 during the initial leftward movement of the piston 52. The piston 52 and its stem 53 act as a pressure intensifier to pressurize the trapped oil to a level closely matching the pressure of the oil in the spring chamber 51 prior to the flow path by the resilient seal 26 being opened. Equalizing the pressure on opposite sides of the soft seal prior to its being opened reduces the erosion effect of the oil. Additionally, the orifice 61 provides a pressure reducing effect in the oil passing through the check valve 10 from the orifice 61 to the passage 58.

Other aspects, objects and advantages of the present invention can be obtained from a study of the drawings, the disclosure and the appended claims.

We claim:

1. A check valve having a poppet normally biased to a closed position blocking fluid flow through the check valve and having an open position establishing communication through the check valve comprising:

a valve body defining a valve seat having a conical face;

a conical face on the poppet and disposed for engagement with the conical face of the valve seat;

an annular groove recessed into one of the conical faces;

a resilient seal disposed within the annular groove, the resilient seal does not extend above the conical face; and an annular protrusion extending from the other of the conical faces and disposed to engage the resilient seal when the conical faces are in engagement.

2. The check valve of claim 1 wherein the annular groove is formed in the conical face of the poppet and the annular protrusion is formed on the conical face of the valve seat.

3. The check valve of claim 1 wherein the body has a pair of bores concentric with and spaced on opposite sides of the valve seat and the poppet has a pair of guide stems slidably disposed within the pair of bores.

4. The check valve of claim 3 wherein at least one of the pair of bores has a plurality of circumferentially spaced longitudinally extending grooves provided in the face.

5. The check valve of claim 1 wherein the poppet is pilot actuated to the open position and includes a piston bore defined in the body and a piston slidably disposed within the piston bore, the piston having a stem disposed for mechanically unseating the poppet from the valve seat.

6. The check valve of claim 5 including a passage defined in the stem of the piston and communicating with the grooves in the bore.

7. The check valve of claim 1 including another valve seat defined in the valve body and a ball resiliently biased into sealing engagement with the another valve seat.

8. The check valve of claim 7 wherein the poppet has a stem disposed to unseat the ball from the another valve seat when the poppet is moved to the open position.

9. The check valve of claim 8 wherein the poppet is pilot actuated to the open position and includes a piston bore defined in the body and a piston slidably disposed within the piston bore, the piston having a stem disposed for mechanically unseating the poppet from the valve seat.

10. The check valve of claim 9 including a passage defined in the stem of the piston and communicating with the grooves in the bore.

* * * * *